April 17, 1951  S. W. MATICA  2,549,381
PIPE THREADER AND CUTTING DEVICE
Filed Nov. 18, 1946  3 Sheets-Sheet 1
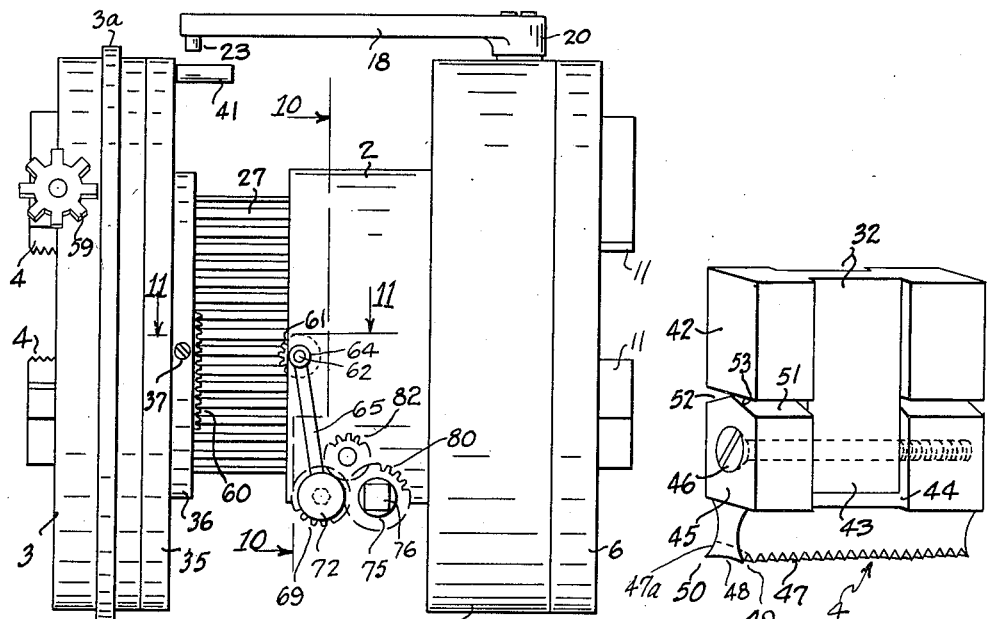
Fig.1.
Fig.3.
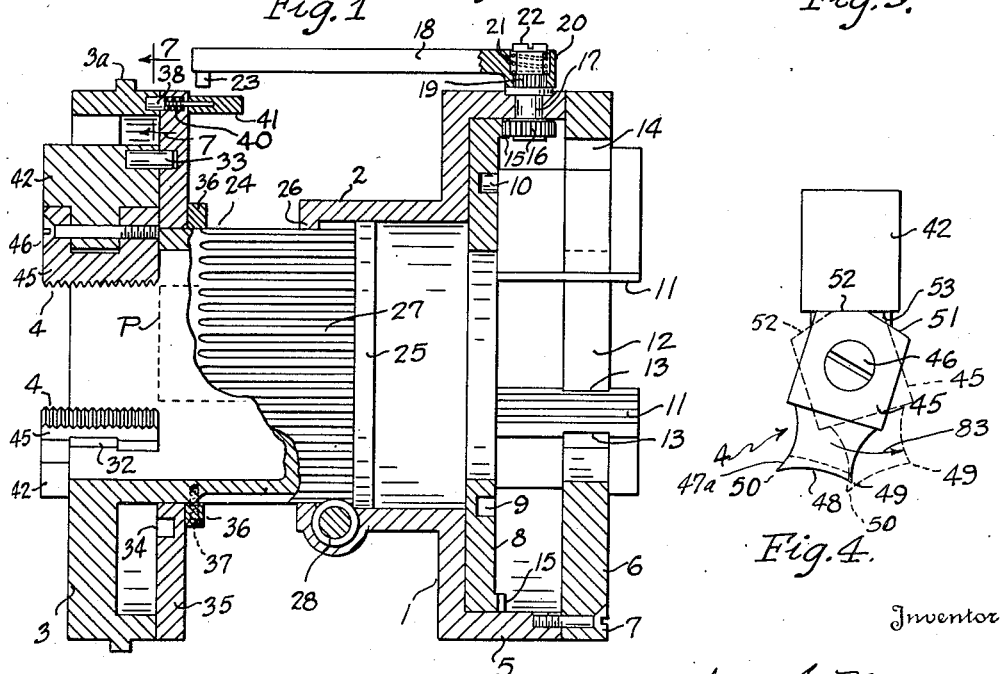
Fig.2.
Fig.4.
Inventor
Stephen W. Matica
By Wooster & Davis
Attorneys April 17, 1951  S. W. MATICA  2,549,381
PIPE THREADER AND CUTTING DEVICE
Filed Nov. 18, 1946  3 Sheets-Sheet 2

Inventor
Stephen W. Matica
By Wooster & Davis
Attorneys

April 17, 1951   S. W. MATICA   2,549,381
PIPE THREADER AND CUTTING DEVICE
Filed Nov. 18, 1946   3 Sheets-Sheet 3

Inventor
Stephen W. Matica
By Wooster & Davis
Attorneys

Patented Apr. 17, 1951

2,549,381

UNITED STATES PATENT OFFICE 2,549,381

PIPE THREADER AND CUTTING DEVICE

Stephen W. Matica, Bridgeport, Conn.

Application November 18, 1946, Serial No. 710,599

8 Claims. (Cl. 10—89)

This invention relates to a pipe threading device, and has for an object to provide a compact light weight device including a chuck to grip the pipe, and which holds the die carriage for the threading dies and means for rotating it.

Another object is to provide an improved die for cutting the threads which operates to partially cut the threads when operated in one direction and finishes the thread when rotated in the opposite direction or backed off from the first cutting operation, so that the threads can be cut faster and with the expenditure of less power.

A further object is to provide an automatic means for disconnecting the driving means and also reversing it at the end of the first operation.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

In these drawings:

Fig. 1 is a side view of my improved thread cutting device;

Fig. 2 is a longitudinal section substantially along the plane of the line 2—2 of Fig. 5, with portions of certain parts being shown in elevation;

Fig. 3 is an enlarged perspective view of one of the threading dies;

Fig. 4 is an end view thereof;

Figure 5:
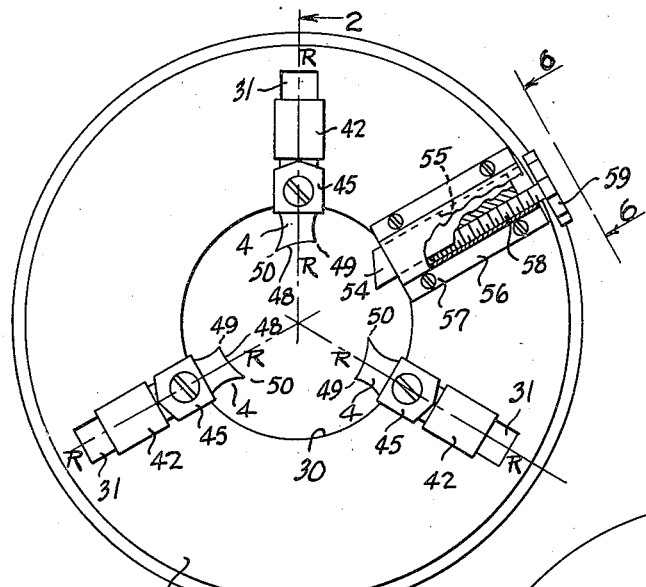
Fig. 5 is a front view of the device looking from the left of Fig. 1, parts being broken away to more clearly show the construction.
Figure 6:
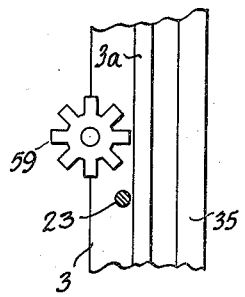
Fig. 6 is a detail view of a portion of the adjusting means of the cutter for cutting off the pipe, the view being taken substantially on the line 6—6 of Fig 5.

The device comprises a combination of chuck for clamping it on the pipe to be threaded and a carriage rotatable and slidable relative to the chuck for carrying the thread cutting dies, and means for driving this carriage. The chuck includes the housing or casing 1 including an extension 2 in which is slidably and rotatably mounted the carriage 3 carrying the thread cutting dies 4. The housing or casing 1 includes an enlarged portion 5 over the open side of which is mounted a guide plate 6 by any suitable means, such as the screws 7. Mounted in this enlarged portion inwardly of the plate 6 is a rotatable cam plate 8 provided with eccentric cam grooves 9 similar to the grooves shown in Fig. 8 and in which run guide pins 10 on the chuck clamping jaws 11. The plate 6 has a central opening 12 whereby it may be slid over the pipe to be threaded and the clamping jaws 11 are located about this opening. These jaws have guide grooves 13 in their opposite side surfaces embracing and guided by the edges of guide grooves 14 formed in the plate 6 and extending radially outward from the opening 12 to guide the jaws 11 for radial movement to and from the pipe to be operated upon. At its outer periphery and at one side thereof the cam plate 8 is provided with a rack 15 extending throughout its periphery and meshing with an adjusting gear 16 on a short shaft 17 mounted in the enlarged portion 5 and operable by the crank arm or handle 18. By rotating this crank or handle the cam plate 8 may be operated to clamp the jaws 11 firmly against the pipe to hold the device in operative position or to release it for removal after the operation is completed. The handle 18 has a connection with the shaft 17 by which it may be placed at different angular positions with respect to the shaft. For this purpose the shaft is provided with a series of longitudinal clutch teeth 19, and the head 20 of the handle has similar clutch teeth operating therewith, but of less width than the head, so that the head may be lifted from the teeth 19 to disconnect the clutch and permit free rotative movement of the handle independently of the shaft. A spring 21 within the head tends to shift it downwardly to hold the clutch in engagement, and the whole assembly is secured together by any suitable means, such as a screw 22. At its opposite or free end the arm 18 carries a stud 23 for a purpose presently to be described.

The support for the threading dies 4 as previously described includes the carriage 3 provided with an outer rib or flange 3a, and has a rearwardly extending cylindrical portion 24 mounted for sliding movement in the sleeve extension 2 of the housing or casing 1, it being provided with an outwardly extending flange 25 adapted to cooperate with an inwardly extending flange 26 in the outer end of the portion 2 to form a guide for the extension 24 and limited movements therein. The outer surface of the extension 24 is provided with worm gear teeth 27 meshing with a transversely extending worm 28 mounted in the extension 2 and operated by suitable gear drive mechanism 29, which will be more fully described later.

Figure 7:
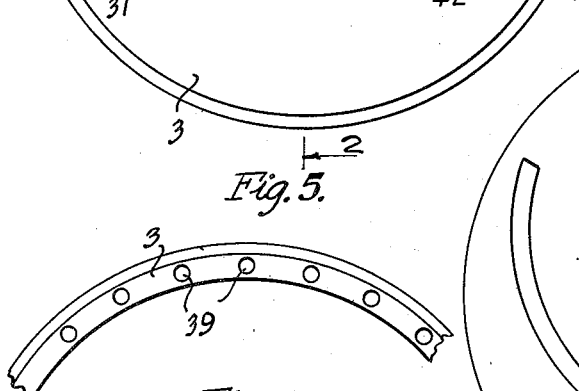
Fig. 7 is an elevation of the edge portion of the front housing ring of the die carriage, taken substantially on line 7—7 of Fig. 2.
Figure 8:
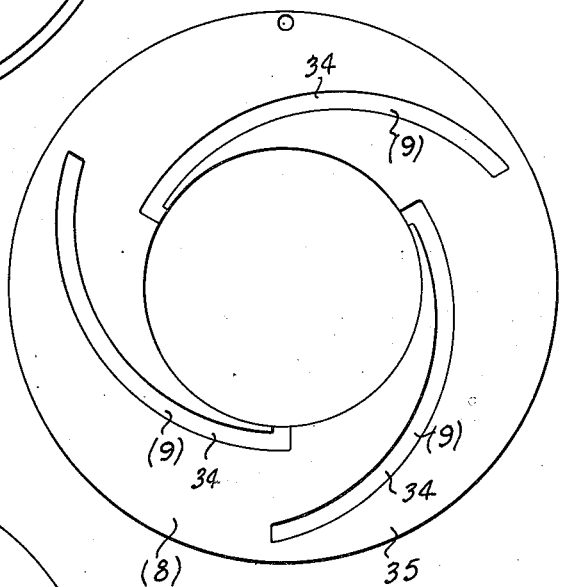
Fig. 8 is a face view of the adjusting or feed cams for the dies.
Figure 9:
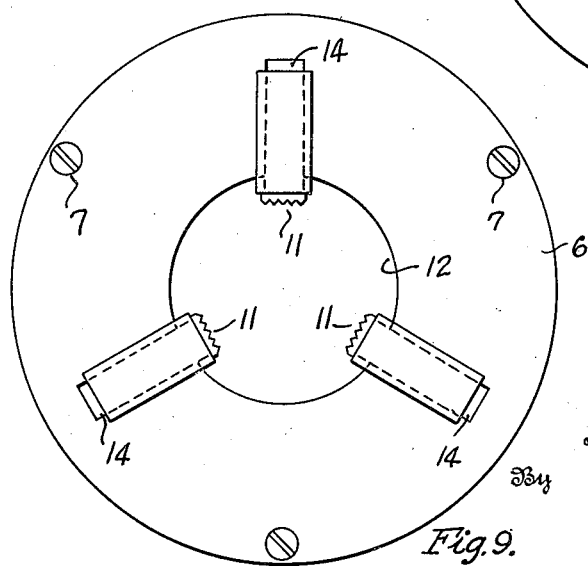
Fig. 9 is a rear view of the device looking from the right of Fig. 1.

The front portion of the carriage 3 is provided with a central opening 30 (Fig. 5) and leading radially from this opening are guide slots 31 for the threading dies 4 to permit adjustment of these dies radially in and out toward and from the pipe to be threaded. For this purpose the threading dies are provided with grooves 32 in their opposite side surfaces embracing the edges of the slots 31 in the casing. Each die carries a guide pin 33 running in a cam slot 34 eccentrically arranged, as shown in Fig. 8, in a cam plate 35 mounted against the rear surface of the carriage 3 and rotatable upon the extension 24, being held against the head by a ring 36 secured to the extension 24 by any suitable means, such as screws 37. Mounted in the cam plate 35 is a locking plug 38 adapted to seat in any one of a series of sockets 39 (Fig. 7) in the rear rim of the head of the carriage 3, and this plug is normally held in the socket by the spring 40. A handle 41 is connected to this plug, and by drawing outwardly or to the right as shown in Fig. 2, the plug 38 may be withdrawn from the socket 39, the cam plate 35 rotated in either direction to adjust the position of the threading dies 4 and then seated in one of the sockets 39 to secure the cam plate and the threading dies in the adjusted position.

These threading dies each comprise two members pivotally connected together. These include the body block 42 in which are formed the guide grooves 32 for guiding the dies in the carriage head, and this block includes a central extension 43 extending into the notch 44 in the cutter block 45. This cutter block is pivoted to the block 42 by any suitable means, such as the pivot screw 46. Along its outer edge this cutter block is provided with a series of cutter teeth 47 of the size and shape of the thread to be cut, and also arranged at the proper pitch, and these teeth are arranged transversely of the curved inner edge 48 of the cutter block. This edge is arranged so that the forward ends of the cutting teeth, indicated at 49, Fig. 4, are of less distance from the center of the pivot 45 than are the rear ends 50, so that the rear ends 50 cut deeper than the forward ends 49. Also the height of the cutter teeth and the notches between them is greater at the rear edge as shown at 47a than at the front 47. If the front cuts one-half of the threads and the rear the other half, then they will be twice the depth at the rear. The cutter block 45, however, has only limited rocking movement on the body block 42, these movements being limited by oppositely inclined stop surfaces 51 and 52 forming the top surfaces of the block 45, and adapted to engage the under surface 53 of the block 42 to limit rocking movements of the cutter block 45 in opposite directions.

Also mounted on one face of the head of the carriage 3 is a cut-off tool 54 (Fig. 5). This is mounted in a suitable radially extended guide 55 formed in the face of the carriage and held therein by a suitably shaped guide plate 56 secured over the cutter bar and held to the carriage by any suitable means, such as the screws 57. The cutter bar 54 is threaded to adjusting screw 58 mounted in the carriage head and carrying at its outer end a star wheel 59 operated to adjust the cutter in a manner presently to be described.

Figure 10:
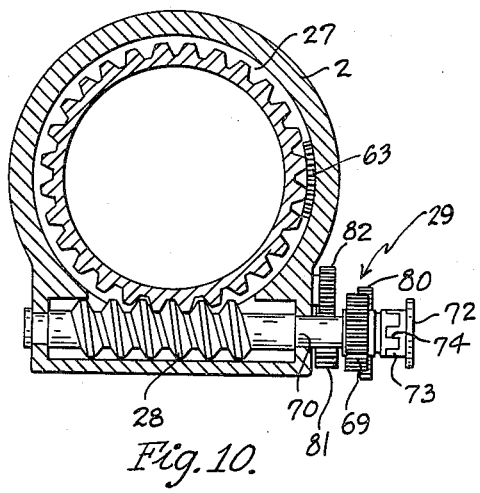
Fig. 10 is a detail section of a portion of the die rotating mechanism taken substantially on line 10—10 of Fig. 1.

Mounted on the rear side of the ring 36 is a rack 60 which, when the carriage is in its innermost position, may mesh with the pinion 61 on a screw 62, and there is a similar rack 63 (Figs. 10 and 11) on the outer side of the flange 25. These racks do not run throughout the entire periphery of the ring or flange, but are segmental racks, as indicated in Figs. 1 and 10.

Figure 11:
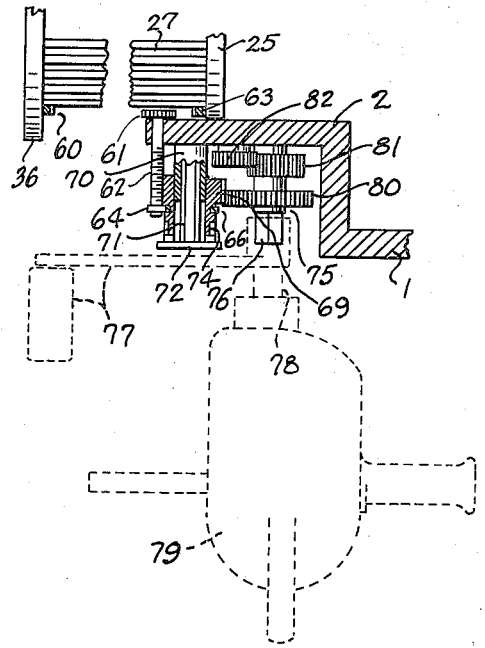
Fig. 11 is a detail section substantially on line 11—11 of Fig. 1, showing different forms of driving means in dotted lines.
Figure 12:
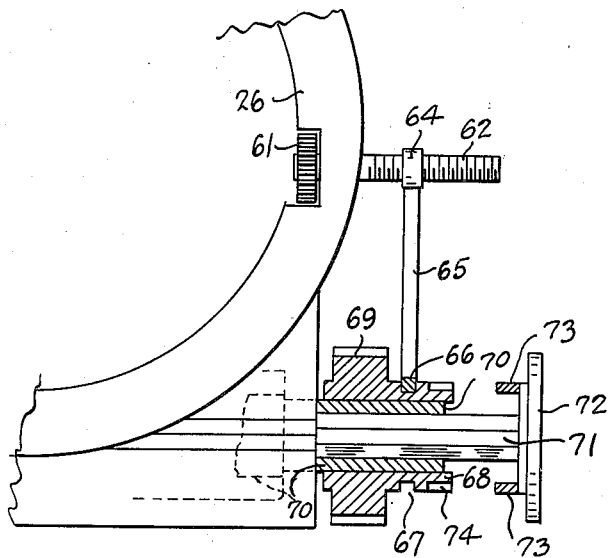
Fig. 12 is a somewhat enlarged section and partial elevation of the gear shifting mechanism.

The screw 62 operated by the pinion 61 is threaded into the head 64 of a rod 65 provided with a fork 66 at its other end seated in an annular groove 67 in the hub 68 of a main driving gear 69. This gear is free to turn on the hollow extension 70 of the shaft of worm 28 and is slidable longitudinally on this shaft. Splined in this hollow shaft for longitudinal sliding movement but held so as to always turn with the shaft is a rod 71. To secure driving connection but to permit sliding movement this rod in the present case is a hexagonal rod in a similarly shaped opening in the shaft 70. Secured to the outer end of this rod is a push button 72 provided with lugs 73 adapted to seat in notches or sockets 74 in the hub 68 of the gear 69 to form a clutch to effect a disconnectable driving connection between the rod 71, the shaft 70 and the gear 69. Mounted to one side of the shaft 70, as shown in Fig. 11, is a main operating shaft 75 having means 76 by means of which it may be operated. In this case the means 76 is a square or hexagonal end adapted to seat in a similarly shaped socket in a hand crank 77 by which it may be operated, or in a similarly shaped socket in the driving shaft 78 of a pneumatic or electric motor 79 adapted to be held in the hand for driving the shaft 75. On the shaft 75 is a gear 80 and a smaller gear 81 meshing with an idler 82. The laterally slidable gear 69 may mesh either with the gear 80, as shown in Fig. 11, to be driven in one direction, or the gear 69 may be slid inwardly, as shown in Fig. 12, to mesh with the gear 82 when it will be driven in the opposite direction.

The operation and use of the device is as follows:

The device is placed on the pipe to be threaded, the free end of the pipe being indicated in dotted lines at P in Fig. 2. The whole device is clamped to this pipe by means of the chuck jaws 11 by turning of the handle 18, which rotates the cam plate 8 by means of the pinion 16 and rack 15, and the action of the eccentric slots or grooves 9 will clamp the jaws against the pipe and hold the device firmly on the pipe.

Now with the device firmly clamped on the pipe, the whole of the die carriage 3 is pushed inwardly or to the right as viewed in Figs. 1 and 2 to the end of the chuck casing 2, so that the stud 23 on the arm 18 may be on the outside of the collar or flange 3a on the carriage 3, and will prevent this carriage from moving outwardly while rotating. The handle 18 can be put into this position parallel to the axis of the device, as shown in Figs. 1 and 2, without interfering with the chuck, by raising the handle and disconnecting it from the drive 19 on the shaft 17, which permits free turning movement of the handle 18. Now, by turning the star wheel 59, the screw 58 may be operated to slide the cutting tool 54 inwardly until its cutting edge engages the pipe. Now if the die carriage 3 is rotated through the worm 28 and the worm gear 27, on every complete turn the star wheel 59 will be turned a partial revolution by engaging the lug 23, and each time shifting the cutter inwardly a small amount so that it cuts deeper and deeper on each revolution and will cut off the pipe at the desired point. Then the cutting tool may be retracted to an inoperative position by rotating the star wheel 59.

The cutting of the thread on the end of the pipe inwardly of this cutting off operation may now be carried out. This is done by shifting the carriage 3 outwardly from the cutting-off position, or to the left as viewed in Figs. 1 and 2, as far as it will go, after, of course, lifting the lug 23 above the flange 3a. In this position the end of the pipe to be threaded will be positioned with respect to the threading dies 4 substantially as shown in dotted lines at P in Fig. 2. The back of the forward or head portion of the carriage 3 is the cam plate 35, and this is normally held stationary with respect to the head 3 by the locking pin or plunger 38. Now, by pulling outwardly on the handle 41, the plunger or pin 38 is withdrawn from the socket 39 in the member 3 and the cam plate 35 may then be rotated until the cutting dies 4 are at the proper height or position with respect to the pipe, these dies being shifted by the eccentric cam grooves 34 in the plate. Then the die plate is locked in this position by the plunger 38 seating in one of the sockets 39. The dies 4, as described above, are made so they will cut two ways because they are made in the two parts 42 and 45, the inner part 45 being hinged to the body part 42 as above described. This permits the inner part 45 to have a limited swinging movement back and forth between two inclined positions to bring either the cutting edge 49 or the cutting edge 50 into cutting position, these movements being limited by the stop surfaces 51 and 52. In Fig. 4 the block is tilted in full lines so the cutting edge 49 is in the cutting position.

After the dies have been brought to the cutting position, the carriage 3 may be rotated by the worm 28 and the worm gear 27 from the drive shaft 75 through the gears 81, 82, 69, and the clutch drive 73, 74 to the shaft 70 of the worm 28. The clutch is engaged for this operation by pushing in the push button 72. The carriage 3 is rotated so the forward edges 49 of the dies will cut one-half the depth of the thread in the outer surface of the pipe. When the full length of the thread has been thus cut, during which the carriage 3 moves inwardly, or to the right as viewed in Figs. 1 and 2, at about the time the ring 36 approaches the end of the casing 2, the rack 60 on this ring engages the small pinion 61 (Figs. 1, 11 and 12) and remains in engagement therewith for partial rotation of ring 36, continued lateral movement of ring 36 being permitted by depth of the teeth on rack 60 and pinion 61. Then movement of the ring 36 rotates this small gear 61 together with screw 62 and through its connection with the forked rod 65 will shift the gear 69 outwardly from mesh with the gear 82 into mesh with the gear 80. The width of gear 69 is slightly less than the distance between gears 80 and 82 so as to mesh with only one of them at a time. The gear 69 now will be reversed or driven in the opposite direction and will therefore drive the worm 28 and the worm gear 27 in the reverse or opposite direction and will therefore rotate the carriage 3 and the threading dies 4 in the opposite direction. As the dies start to move in the reverse or opposite direction, or to the left as viewed in Fig. 4, the other cutting edge 50 of the die is brought into the half-cut threads in the pipe because the rear edge of the die ending in the cutting edge 50 is somewhat longer than the forward side ending in the cutting edge 49. This will cause the die block 45 to swing to the right, as indicated by the arrow 83 in Fig. 4, bringing the stop 55 against the stop 53, at which time the block 45 will be inclined in the opposite direction or in the dotted line position of Fig. 4, and the cutting edge 50 will now be in cutting position. As the carriage 3 and these dies are now rotated to the left or counterclockwise, these cutting edges 50 will cut the remaining half of the thread, and during this operation the carriage 3 with the dies will be shifted outwardly or to the left as viewed in Figs. 1 and 2. As the inner end of the dies reaches the outer end of the pipe, the rack 63 (Figs. 10 and 11) at the inner end of the worm gear 27 will engage the pinion 61 and turn it in the opposite direction so as to shift the gear 69 inwardly, or to the left as shown in Figs. 10 and 12, or upwardly as shown in Fig. 11, to disconnect it from gear 80 and to bring it into mesh with the gear 82. During this movement the clutch 73, 74 between the worm shaft 70 and the push button 72 is disconnected because the push button 72 will not move inwardly with the gear 69. The driving connection therefore of shaft 75 to the operating worm 28 is thus disconnected and rotation of the carriage 3 and threading dies 4 will be arrested. The cutting of the thread is thus completed and the device may be removed from the pipe by loosening the chuck jaws 11. It may be clamped on another pipe to be threaded and operated in the same manner, the operation of the carriage 3 with the cutting dies being started by shifting the push button 72 inwardly to engage the clutch 73, 74.

It will be seen that this device is firmly clamped in position on the pipe during the thread cutting operation, and it may be employed for cutting off the pipe to proper length and then threading it as desired. Because of the improved design, less power is required, and there is less strain and friction. Therefore the chuck casing, the die carriage and the cam plates can be made of relatively light castings and of relatively light material, such, for example, as aluminum or aluminum magnesium alloys. It will also be seen that the chuck, cutting off and threading mechanism are all built in the one complete assembly which is mounted and clamped on the pipe with a single operation, and that it may be operated with a single hand crank or power device.

Having thus set forth the nature of my invention, I claim:

1. A pipe threading device comprising a casing, clamping jaws in the casing, means for operating the jaws to clamp the device on a pipe, a carriage mounted in the casing for movement longitudinally of the jaws, threading dies mounted in the carriage each comprising a block mounted on a pivot to swing about an axis extending longitudinally of the jaws, means to limit said swinging movements, said block being provided with front and rear edges at its inner end provided with cutting teeth, the teeth on one edge being adapted to cut part of the depth of a screw thread in the pipe when the carriage is rotated in one direction and the teeth on the other edge being longer and extending a greater distance from the pivot than the opposite edge to cut the remaining depth of the thread when the carriage is rotated in the opposite direction, and means in the casing for rotating the carriage first in one direction and then in the other to cut the thread.

2. A pipe threading device comprising a carriage, thread cutting dies each mounted on a pivot in the carriage and each provided with front and rear edges formed with thread cutting teeth, the teeth on one edge being of a length and positioned to cut a portion of a screw thread on a pipe when rotated around the pipe in one direction and the teeth on the other edge being of a greater length and extending a greater distance from the pivot than the opposite edge to cut the remaining depth of the thread when rotated about the pipe in the opposite direction, and means in the housing for turning the carriage first in one direction and then in the other to cut said thread.

3. A pipe threading device comprising a carriage, thread cutting dies mounted in the carriage each including a member mounted for limited swinging movements about a pivotal axis extending longitudinally of the dies, said member being provided with spaced front and rear cutting edges at its inner end each formed with thread cutting teeth, the teeth on one edge being positioned to cut a portion of a screw thread in the pipe when the carriage is rotated in one direction and the die member is swung in the opposite direction, the other edge being formed with teeth of greater length and extending a greater distance from the pivotal axis than the opposite edge to cut the remainder of the thread when the carriage is rotated in the opposite direction and the die member swung in the other direction, and means in the casing for turning the carriage first in one direction and then in the other to cut the thread.

4. A pipe threading device comprising a carriage, thread cutting dies mounted in the carriage each including a block mounted in the carriage for radial adjustment and a cutter member pivoted to the block for limited swinging movement about a pivotal axis extending longitudinally of the dies, each said cutting member being provided with spaced front and rear cutting edges at its inner end each formed with thread cutting teeth, the teeth on one edge being positioned to cut a portion of a screw thread in the pipe when the carriage is rotated in one direction and the die member is swung in the opposite direction, the other edge being formed with teeth of greater length and extending a greater distance from the pivotal axis than the opposite edge to cut the remainder of the thread when the carriage is rotated in the opposite direction and the die member swung in the other direction, and means for turning the carriage first in one direction and then in the other to cut the thread.

5. A pipe threading device comprising a casing adapted to embrace a pipe to be threaded, a radially slotted plate closing the inner end of the casing, a chuck jaw mounted in each slot, a cam plate mounted in the casing provided with eccentric slots, means connecting each jaw with a slot, means for rotating the cam plate to clamp the jaws on the pipe comprising a gear rack on the plate and a gear meshing therewith, means operating the gear including a shaft and a hand lever, a releasable clutch connecting the lever with the shaft, a carriage mounted for rotating and longitudinal sliding movement in the casing and provided with an annular shoulder, a lug on the lever adapted to cooperate with said shoulder to prevent longitudinal movement of the carriage, a cutter on the carriage movable toward and from the pipe, and means in the casing for rotating the carriage.

6. A pipe threading device comprising a casing adapted to embrace a pipe to be threaded, means in the casing for clamping the casing on the pipe, a carriage including an extension mounted for rotary and longitudinal sliding movement in the casing, said extension being formed to provide a worm gear extending longitudinally thereof, a shaft, a worm on the shaft meshing with the worm gear to rotate the carriage, a driving gear free on the shaft and slidable longitudinally thereon, a bar splined to the shaft and including a push button, cooperating clutch means on the push button and the drive gear, gears spaced longitudinally of the shaft to mesh with the drive gear to rotate it in opposite directions, means on the casing for driving the spaced gears, means for shifting the drive gear between the spaced gears including a screw connected with the drive gear and operated by a pinion, spaced racks on the carriage arranged to mesh with the pinion at opposite extreme longitudinal movements of the carriage to shift the drive gear and reverse movement of the carriage, and screw thread cutting dies mounted in the carriage.

7. A pipe threading device comprising a casing adapted to embrace a pipe to be threaded, means in the casing for clamping the casing on the pipe, a carriage including an extension mounted for rotary and longitudinal sliding movement in the casing, said extension being formed to provide a worm gear extending longitudinally thereof, a worm in the casing meshing with said worm gear to rotate the carriage, means on the casing for driving the worm in opposite directions, a reversing mechanism for the worm driving means, means on the carriage arranged to operate the reversing mechanism at the opposite extreme longitudinal movements of the carriage, and screw thread cutting dies mounted in the carriage.

8. A pipe threading device comprising a casing adapted to embrace a pipe to be threaded, means in the casing for clamping the casing on the pipe, means for operating the clamping means including an operating lever carried by the casing, a carriage including an extension mounted for rotary and longitudinal sliding movement in the casing, means in the casing for rotating the carriage, radially movable thread cutting dies mounted in the carriage, a radially movable cut off tool carried by the carriage, said carriage being provided with an external peripheral flange, a shoulder on said lever to engage said flange to prevent longitudinal movement of the carriage during cut off operations, and releasable means on the casing connecting the lever with the clamping operating means.

STEPHEN W. MATICA.

REFERENCES CITED

The following references are of record in the file of this patent:

UNITED STATES PATENTS

| Number | Name | Date |
| --- | --- | --- |
| 167,645 | Cohen and Frank | Sept. 14, 1875 |
| 253,996 | Forbes | Feb. 21, 1882 |
| 660,001 | Carstensen | Oct. 16, 1900 |
| 774,934 | Card | Nov. 15, 1904 |
| 1,431,191 | Elliott | Jan. 15, 1924 |
| 1,616,542 | Nonneman | Feb. 8, 1927 |
| 1,705,240 | Devine | Mar. 12, 1929 |
| 2,205,148 | Mayotte | June 18, 1940 |
| 2,374,240 | Cook | Apr. 24, 1945 |

FOREIGN PATENTS

| Number | Country | Date |
| --- | --- | --- |
| 1,411 | Great Britain | May 23, 1865 |
| 1,765 | Great Britain | May 14, 1873 |
| 21,578 | Great Britain | Dec. 10, 1891 |